United States Patent
Altus et al.

(10) Patent No.: US 9,921,295 B2
(45) Date of Patent: Mar. 20, 2018

(54) MULTIPLE CHIRP GENERATION IN A RADAR SYSTEM

(71) Applicant: Texas Instruments Incorporated, Dallas, TX (US)

(72) Inventors: Tom Altus, Plano, TX (US); Jasbir Singh Nayyar, Bangalore (IN); Karthik Ramasubramanian, Bangalore (IN); Brian Paul Ginsburg, Allen, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 410 days.

(21) Appl. No.: 14/586,854

(22) Filed: Dec. 30, 2014

(65) Prior Publication Data

US 2016/0187462 A1 Jun. 30, 2016

(51) Int. Cl.
*G01S 7/282* (2006.01)
*G01S 7/35* (2006.01)
*G01S 13/34* (2006.01)

(52) U.S. Cl.
CPC ............... *G01S 7/35* (2013.01); *G01S 13/34* (2013.01); *G01S 13/343* (2013.01)

(58) Field of Classification Search
CPC ........ G01S 13/931; G01S 13/536; G01S 7/28; G01S 7/35
USPC .............................................. 342/70–72, 175
See application file for complete search history.

(56) References Cited

U.S. PATENT DOCUMENTS

| | | | | |
|---|---|---|---|---|
| 5,303,079 A | * | 4/1994 | Gnauck | G02F 1/225 385/8 |
| 6,091,356 A | * | 7/2000 | Sanders | G01S 7/282 331/1 R |
| 2007/0152870 A1 | * | 7/2007 | Woodington | G01S 7/414 342/70 |
| 2007/0152873 A1 | * | 7/2007 | Hunt | G01S 7/28 342/159 |
| 2010/0289692 A1 | * | 11/2010 | Winkler | G01S 7/4008 342/70 |
| 2013/0234880 A1 | * | 9/2013 | Lee | G01S 13/345 342/70 |
| 2015/0002328 A1 | * | 1/2015 | Vaucher | G01S 7/02 342/88 |

* cited by examiner

*Primary Examiner* — Marcus E Windrich
(74) *Attorney, Agent, or Firm* — Ronald O. Neerings; Charles A. Brill; Frank D. Cimino

(57) ABSTRACT

A radar device is provided that includes a timing control component operable to generate, for each chirp of a sequence of chirps according to a set of chirp configuration parameters and a chirp profile for the chirp, chirp control signals to cause the radar device to transmit the chirp, the timing control component having chirp configuration parameter inputs, chirp profile parameter inputs, a chirp address output, and chirp control signal outputs, a chirp configuration storage component having chirp configuration parameter outputs coupled to corresponding inputs of the configuration parameter inputs of the timing control component, a chirp profile address output, and a chirp address input coupled to the chirp address output, and a chirp profile storage component having chirp profile parameter outputs coupled to the chirp profile parameter inputs of the timing control component; and a chirp profile address input coupled to the chirp profile address output.

20 Claims, 3 Drawing Sheets

MULTIPLE CHIRP GENERATION IN A RADAR SYSTEM

BACKGROUND OF THE DISCLOSURE

Field of the Invention

Embodiments of the present disclosure generally relate to radar systems, and more specifically relate to multiple chirp generation in a radar system.

Description of the Related Art

Frequency Modulated Continuous Wave (FMCW) automotive radar systems transmit and receive parameterized frequency-modulated signals commonly referred to as chirps. Many such radar systems are implemented using mostly analog circuits with a programmable digital timing engine for configuring chirps. Typically, the parameter values of a chirp to be transmitted are written by a software program to a set of parameter registers in the timing engine. Typical applications of automotive radar systems require that the radar systems transmit a "burst" or sequence of chirps (which may be referred to as a "frame") with minimal time gap between the chirps. A frame of chirps may include a large number (e.g., 256 or 512) of chirps, each of which may have different parameter values. To avoid allocating the large area of silicon that would be needed to have one set of parameter registers for each chirp in a frame, current radar systems typically have a few (e.g., 2-4) sets of chirp parameter registers that are used by the software program in a round-robin fashion. Thus, the software that is setting the parameters for the chirps is required to continuously operate in real-time to configure parameters of a subsequent chirp while a current chirp is transmitted.

SUMMARY

Embodiments of the present disclosure relate to methods and apparatus for multiple chirp generation in a radar device. In one aspect, a radar device is provided that includes a timing control component operable to generate, for each chirp of a sequence of chirps according to a set of chirp configuration parameters and a chirp profile for the chirp, chirp control signals to cause the radar device to transmit the chirp, the timing control component having a set of chirp configuration parameter inputs, a set of chirp profile parameter inputs, a chirp address output, and a set of chirp control signal outputs, a chirp configuration storage component having a set of chirp configuration parameter outputs coupled to corresponding inputs of the set of configuration parameter inputs of the timing control component, a chirp profile address output, and a chirp address input coupled to the chirp address output, and a chirp profile storage component having a set of chirp profile parameter outputs coupled to the set of chirp profile parameter inputs of the timing control component; and a chirp profile address input coupled to the chirp profile address output.

In one aspect, a method for generating a frame of chirps in a radar device is provided that includes programming a set of chirp configuration parameter values for each chirp in the frame of chirps, in which each set of chirp configuration parameter values includes a chirp profile selection parameter value indicating a chirp profile for the chirp, programming chirp profile parameter values of at least one chirp profile, and generating, sequentially for each chirp in the frame, chirp control signals to cause the radar device to transmit the chirp, wherein generation of the control signals is based on the set of chirp configuration parameter values for the chirp and the chirp profile indicated by the chirp profile selection parameter value of the chirp.

BRIEF DESCRIPTION OF THE DRAWINGS

Particular embodiments will now be described, by way of example only, and with reference to the accompanying drawings.

DETAILED DESCRIPTION OF EMBODIMENTS OF THE DISCLOSURE

Figure 1:
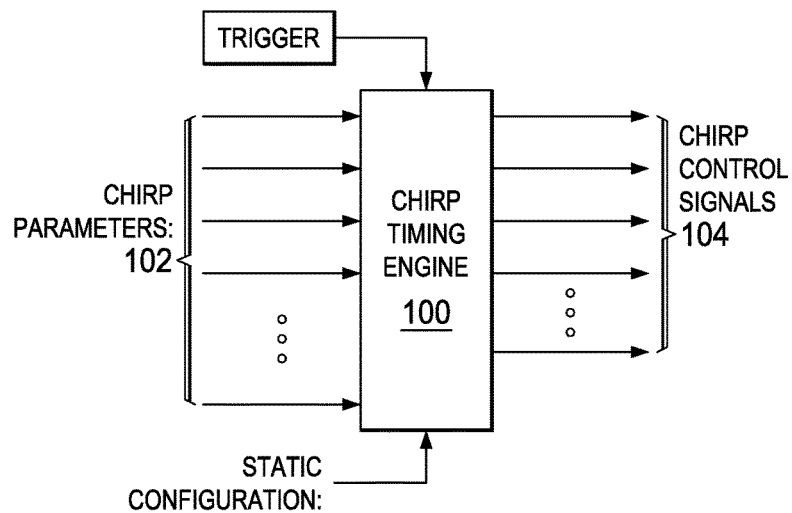
FIG. 1 is a block diagram of a prior art chirp timing engine.

Specific embodiments of the disclosure will now be described in detail with reference to the accompanying figures. Like elements in the various figures are denoted by like reference numerals for consistency.

As previously mentioned, typical applications of automotive FMCW radar systems require transmission of large frames of chirps with varying parameters and minimal time gaps between the chirps. A software programmable digital timing engine in a radar system may be used to configure the chirps in a frame. FIG. 1 is a high level block diagram of an example prior art digital chirp timing engine 100. The timing engine 100 receives some number of chirp parameters 102 as inputs and uses these parameters to generate chirp control signals 104 for various parts of the radar system. The chirp parameters 102 are defined by the radar system architecture and may include, for example, a transmitter enable parameter for indicating which transmitters to enable, a chirp frequency start value, a chirp frequency ramp slope, analog-to-digital (ADC) sampling start and end times, transmitter power on and power off times, etc. Similarly, the chirp control signals 104 are defined by the radar system architecture and may include, for example, a transmitter enable signal for each transmitter, the desired instantaneous transmitting frequency, control register values for a radio frequency synthesizer, a signal indicating that ADC output is valid, etc.

The chirp parameter values are supplied by an application software program executing on a processor external to the chirp timing engine 100. The application software operates to store the desired parameter values for each chirp in registers of the chirp timing engine 100. For this example, two sets of registers are assumed. To transmit a frame of 256 chirps, the application software operates in real-time, using the register sets in a round robin fashion to set the parameter values of a subsequent chirp while the timing engine 100 is processing the parameters of the current chirp.

Embodiments of the disclosure provide for programming the parameter values of multiple sequential chirps to be transmitted by an FMCW radar device, i.e., a frame of chirps, such that the frame of chips can be transmitted in real time without further external intervention. For example, in some embodiments, application software of the radar device can program all chirp parameter values for all chirps in a frame and then trigger the timing engine to transmit the frame, thus reducing the software processing overhead of the prior art. Further, the amount of storage, e.g., the number of registers, needed to store all the parameter values for all chirps in a frame is significantly reduced from what would be required in the prior art.

Figure 2:
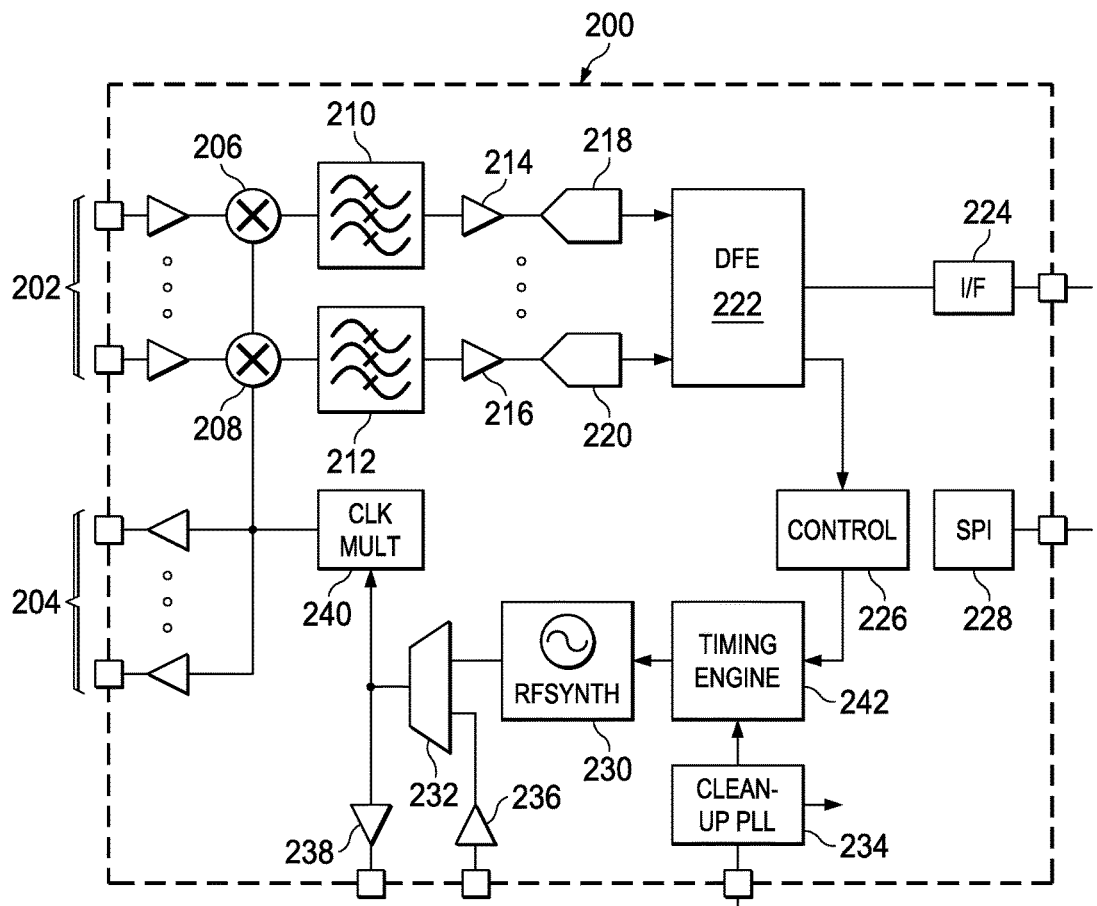
FIG. 2 is a block diagram of an example Frequency Modulated Continuous Wave (FMCW) radar device.

FIG. 2 shows a block diagram of an example FMCW radar device 200 providing multiple chirp generation. The radar device 200 may include multiple transmit channels 204 for transmitting FMCW signals and multiple receive channels 202 for receiving the reflected transmitted signals. Further, the number of receive channels may be larger than the number of transmit channels. For example, an embodiment of the radar device 200 may have two transmit channels and four receive channels. A transmit channel includes a suitable transmitter and antenna. A receive channel includes a suitable receiver and antenna. Further, each of the receive channels 202 are identical and include a mixer 206, 208 to mix the transmitted signal with the received signal to generate a beat signal, a baseband bandpass filter 210, 212 coupled to an output of the mixer 206, 208 for filtering the beat signal, a variable gain amplifier (VGA) 214, 216 coupled to an output of the filter 210, 212 for amplifying the filtered beat signal, and an analog-to-digital converter (ADC) 218, 220 coupled to an output of the VGA 214, 216 for converting the analog beat signal to a digital beat signal.

The receive channels 202 are coupled to inputs of a digital front end (DFE) 222 that performs decimation filtering on the digital beat signals to reduce the data transfer rate. The DFE 222 may also perform other operations on the digital beat signals, e.g., DC offset removal. The DFE 222 is coupled to an input of a high speed serial interface (I/F) 224 that transfers the output of the DFE 222 to the processing unit 106.

The control component 226 includes functionality to control the operation of the radar device 200. The control component 226 may include, for example, a buffer to store the output samples of the DFE 222, an FFT (Fast Fourier Transform) engine to compute spectral information of the buffer contents, and an MCU that executes software to program the chirp parameters of frames of chirps to be transmitted. The software, which may be specific to the particular application of the radar device, is operable to program the timing engine 242 for transmission of frames of chirps. More specifically, the software includes functionality to program chirp configuration parameters and chirp profile parameters for a frame of chirps and to trigger the timing engine 242 to effect transmission of the frame of chirps using the programmed parameter values.

The programmable timing engine 242 includes functionality to store chirp parameters for a frame of chirps and to control the transmission and reception of the chirps in a frame based on the parameter values. The timing engine 242 is discussed in more detail in reference to FIG. 3.

The radio frequency synthesizer (RFSYNTH) 230 is coupled to outputs of the timing engine 242 to receive chirp control signals and includes functionality to generate FMCW signals for transmission based on the chirp control signals from the timing engine 242. In some embodiments, the RFSYNTH 230 includes a phase locked loop (PLL) with a voltage controlled oscillator (VCO).

The serial peripheral interface (SPI) 228 provides an interface for receiving communication with external devices.

The multiplexer 232 is coupled to inputs of the RFSYNTH 230 and the input buffer 236. The multiplexer 232 is configurable to select between signals received in the input buffer 236 and signals generated by the RFSYNTH 230. The output buffer 238 is coupled to an output of the multiplexer 232 and may be used transmit signals selected by the multiplexer 232 to an external device.

The clock multiplier 240 increases the frequency of the transmission signal (LO signal) to the LO frequency of the mixers 206, 208.

The clean-up PLL (phase locked loop) 234 operates to increase the frequency of the signal of an external low frequency reference clock (not shown) to the frequency of the RFSYNTH 230 and to filter the reference clock phase noise out of the clock signal.

Figure 3:
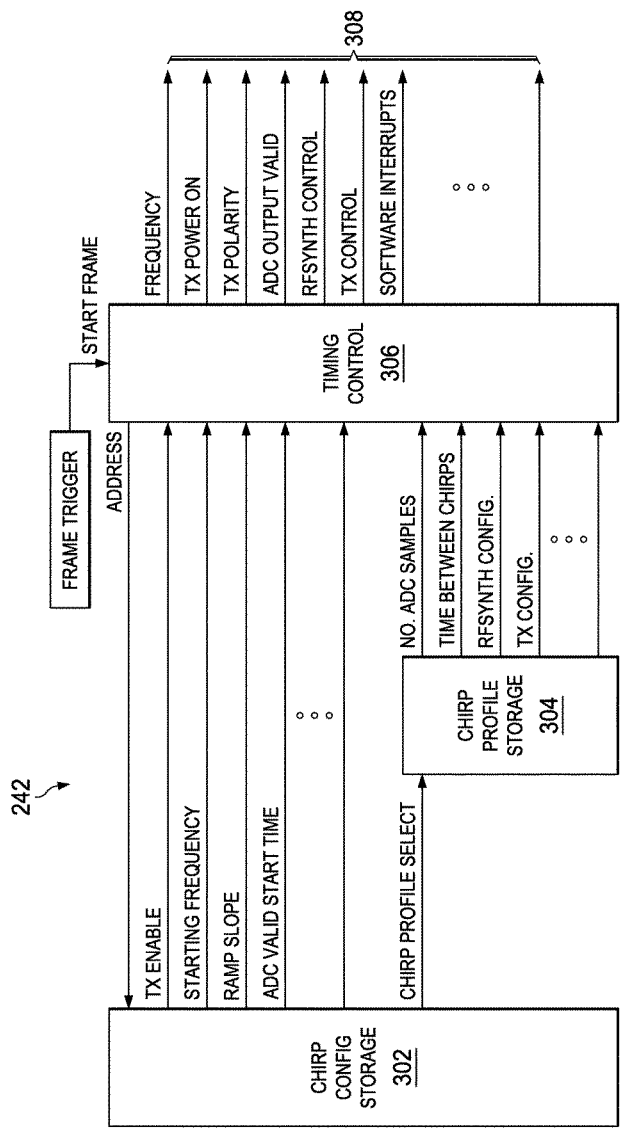
FIG. 3 is a block diagram of the chirp timing engine of FIG. 2.

FIG. 3 is a block diagram of the timing engine 242 of FIG. 2. The architecture of the timing engine is designed to support multiple chirp generation, i.e., the generation of a frame of sequential chirps, without the need for software intervention to program chirp parameters while the frame is being transmitted. The chirp parameters supported by the radar device 200 are divided into two groups. A first group includes those parameters that are most likely to be changed frequently across chirps in frame, i.e., chirp configuration parameters, and a second group includes those parameters that are most likely to have values common to multiple chirps (if not all chirps) in a frame, i.e., chirp profile parameters. The chirp profile parameters are referred to collectively as a chirp profile.

The number and types of chirp parameters of a radar device may depend on the particular architecture of the device. Further, the number and types of chirp configuration parameters and the number and types of chirp parameters in a chirp profile may depend on factors such as the particular architecture of the device and the applications the device is intended to support. Some example chirp parameters are depicted in FIG. 3. In this example, the chirp configuration parameters include a transmitter enable parameter (TX Enable) for indicating which transmitters are to be enabled for a chirp, a starting frequency parameter for specifying the initial frequency of a chirp, a ramp slope parameter for specifying the slope of the frequency ramp of a chirp, and a parameter for specifying when the output of the ADC is initially valid for a chirp (ADC Valid Start Time). The chirp configuration parameters may also include a chirp profile select parameter (Chirp Profile Select) used to indicate the particular chirp profile to be used for the chirp. Some example chirp profile parameters include a parameter specifying the number of ADC samples to process (No. ADC Samples), a parameter specifying the time between chirps, frequency synthesizer configuration parameters (RFSYNTH Config), and transmitter configuration parameters (TX Config).

The timing engine 242 includes a chirp configuration storage component 302 to store a set of chirp configuration parameters for each chirp in a frame to be transmitted, a chirp profile storage component 304 to store multiple chirp profiles, and a timing control component 306 coupled to parameter outputs of the storage components 302, 304. The storage components 302, 304 may be implemented as, for example, registers or random access memory or a combination thereof. A trigger input (frame trigger) of the timing control component 306 is coupled to an output of the control component 226 to receive a trigger signal indicating that transmission of a frame of chirps is to begin. A chirp address output of the timing control component 306 is coupled to a chirp address input of the chirp configuration storage 302. Chirp control signal outputs 308 of the timing control component 306 are coupled to corresponding inputs of components in the radar device 200. For example, chirp control signal outputs may be coupled to corresponding chirp control signal inputs of the transmit channels 204, the receive channels 202, and the RFSYNTH 230. In some embodiments, the timing control component 306 is implemented as a state machine.

The chirp configuration storage component 302 is sized to hold values for the chirp configuration parameters for the maximum frame size supported by the radar device 200. For example, if the maximum frame size is 512 chirps and there are 6 chirp configuration parameters, the chirp configuration storage component 302 includes sufficient storage capacity to store values for 512 sets of chirp configuration parameter values, i.e., 6×512 parameter values. A chirp profile address output (Chirp Profile Select) is coupled to a chirp profile address input of the chirp profile storage component 304. Chirp configuration parameter outputs of the chirp configuration storage component 302 are coupled to corresponding chirp configuration parameter inputs of the timing control component 306.

The chirp profile storage component 304 may be sized to hold multiple chirp profiles. For example, if the number of chirp profile parameters is 18 and the number of chirp profiles is 16, the chirp profile storage component 304 includes sufficient storage capacity to store 16 sets of chirp profile parameter values, i.e., 16×18 chirp profile parameter values. Chirp profile parameter outputs of the chirp profile storage component 304 are coupled to corresponding chirp profile parameter inputs of the timing control component 306.

The number of chirp profiles in the chirp profile storage component 304 may be dependent on the architecture of the radar device. For example, if there are multiple transmitters, a profile for each transmitter may be needed. In another example, if the radar device may be used in multiple modes, e.g., short range, mid range, and long range, a profile for each mode may be needed. Further, extra profile storage may be included for more chirp programming flexibility. In another example, for a simpler radar device, there may be a single chirp profile or a small number of profiles.

Note that the amount of storage needed, e.g., the number of registers, needed to store all the parameter values for all chirps in a frame is significantly reduced from what would be required in the prior art. For example, in the prior art, if there are 22 chirp parameters and the maximum frame size is 512 chirps, storage for 22×512 parameter values is needed in order to program all parameter values for all chirps in a frame of 512 chirps prior to transmission.

In operation, responsive to a frame trigger signal received via the trigger input, the timing control component 306 receives chirp parameter values for a frame of chirps from the storage components 302, 304 and uses these parameter values to output chirp control signals 308 for various components of the radar system 200 to effect transmission and reception of each of the chirps in the frame. Once triggered, the timing control component 306 iterates through the sets of chirp configuration parameter values stored in the chirp configuration storage component 302, sending successive chirp addresses to the chirp configuration storage component 302 to access the chirp parameter values for each chirp in the frame. Responsive to a chirp address, the chirp configuration storage component 302 provides the requested set of chirp configuration parameter values to the timing control component 306 via the chirp configuration parameter outputs.

Also responsive to the chirp address, the chirp configuration storage component 302 sends the chirp profile address in the requested set of chirp configuration parameters to the chirp profile storage component 304 via the chirp profile address output. Responsive to the received chirp profile address, the chirp profile storage component 304 provides the requested chirp profile parameter values to the timing control component 306 via the chirp profile parameter outputs.

The number and type of chirp control signals generated by a timing control component in a radar device are architecture dependent. As shown in FIG. 3, example chirp control signals 308 may include the desired instantaneous frequency (Frequency) for a chirp, a control signal enabling a transmitter (TX Power On), a transmitter polarity control signal (TX Polarity), a control signal indicating that the output of an ADC is valid (ADC Output Valid), frequency synthesizer control signals (RFSYNTH Control), transmitter control signals (TX Control), software interrupts, etc.

Figure 4:
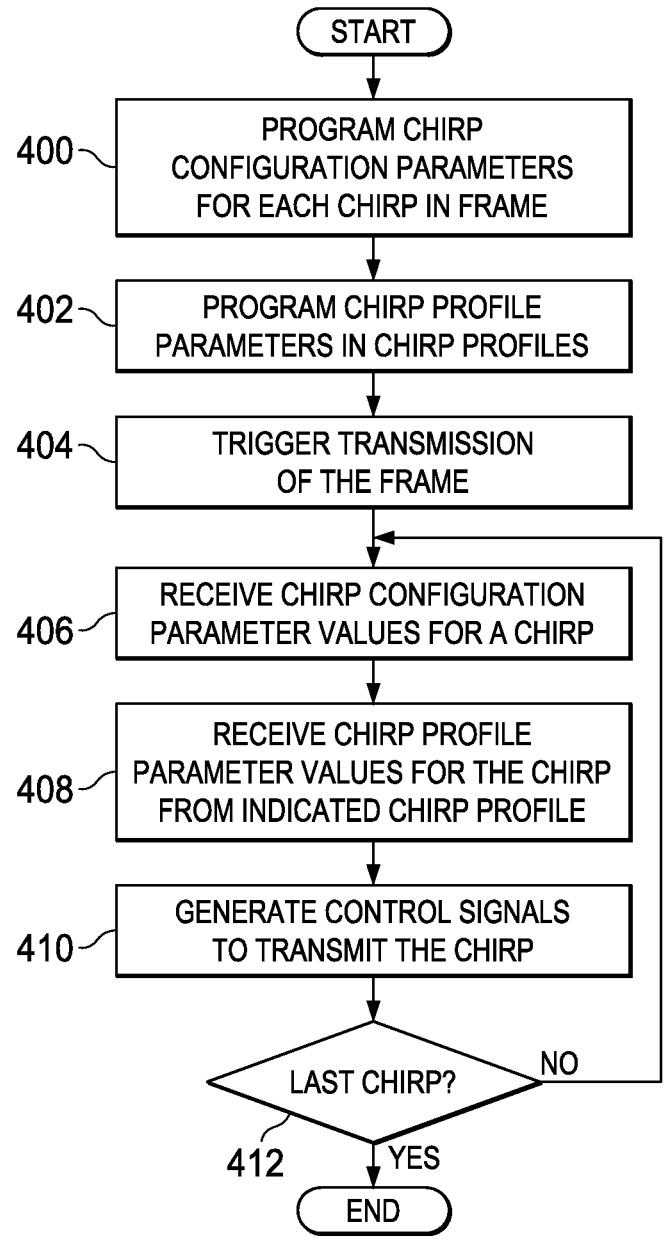
FIG. 4 is a flow diagram of a method for multiple chirp generation.

FIG. 4 is a flow diagram of a method for multiple chirp generation in a radar device having a timing engine such as that of FIG. 3, e.g., the radar device of FIG. 2. For simplicity of explanation, the method is explained in reference to the radar device of FIGS. 2 and 3. One of ordinary skill in the art will understand embodiments of the method for other radar devices. Further, embodiments are described assuming a timing engine with multiple chirp profiles. One of ordinary skill in the art will understand embodiments having a single chirp profile.

Initially, chirp configuration parameters are programmed 400 for each chirp in a frame of chirps to be transmitted. That is, for each chirp in the frame, software executing in the control component 226 programs (sets the values of) a set of chirp configuration parameters in the chirp configuration storage component 302. For example, if the frame includes 512 chirps, 512 sets of chirp configuration parameters are programmed.

Chirp profile parameters in chirp profiles indicated in the programmed sets of chirp configuration parameters may also be programmed 402. That is, for each chirp profile indicated by a chirp profile select parameter in the programmed sets of chirp configuration parameters, the software programs the chirp profile parameters in that profile in the chirp profile storage component 304. This programming may include changing one, multiple, or all parameter values in the profile. Note that a chirp profile may be used by one, several, or all chirps in a frame. In some embodiments, this step is performed as needed. For example, the values of the parameters in a chirp profile may be used for transmission of multiple frames and thus not changed for each frame in which the profile is used. In another example, the chirp profiles may be programmed one time when the radar device is turned on and remain static during operation of the device.

Once the chirp configuration parameters and chirp profiles (optionally) are programmed, transmission of the frame of chirps is triggered 404. That is, the control component 226 signals the timing control component 306 to initiate the transmission of the frame of chirps. The timing control component 306 then iterates 406-412 through the sets of chirp configuration parameters stored in the chirp configuration storage component 302 to effect the transmission and reception of each specified chirp by the radar device 200. More specifically, for each chirp in the frame 412, the timing control component 306 receives 406 the set of chirp configuration parameter values for the chirp from the chirp configuration storage component 302, receives 408 the chirp profile parameter values for the chirp from the chirp profile indicated by the chirp profile select parameter from the chirp profile storage component 304, and generates 410 control signals based on these parameter values to cause the chirp to be transmitted.

Other Embodiments

While the disclosure has been described with respect to a limited number of embodiments, those skilled in the art, having benefit of this disclosure, will appreciate that other embodiments can be devised which do not depart from the scope of the disclosure as disclosed herein.

For example, embodiments have been described herein in which the chirp parameter programming is performed by the control component of the radar device. One of ordinary skill in the art will understand embodiments in which some or all of the chirp parameter programming is performed by an external MCU or other suitable processor.

Although method steps may be presented and described herein in a sequential fashion, one or more of the steps shown in the figures and described herein may be performed concurrently, may be combined, and/or may be performed in a different order than the order shown in the figures and/or described herein. Accordingly, embodiments should not be considered limited to the specific ordering of steps shown in the figures and/or described herein.

Certain terms are used throughout the description and the claims to refer to particular system components. As one skilled in the art will appreciate, components in radar systems may be referred to by different names and/or may be combined in ways not shown herein without departing from the described functionality. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" and derivatives thereof are intended to mean an indirect, direct, optical, and/or wireless electrical connection. Thus, if a first device couples to a second device, that connection may be through a direct electrical connection, through an indirect electrical connection via other devices and connections, through an optical electrical connection, and/or through a wireless electrical connection, for example.

It is therefore contemplated that the appended claims will cover any such modifications of the embodiments as fall within the true scope of the disclosure.

What is claimed is:

1. A radar device comprising:
a timing control component operable to generate, for each chirp of a sequence of chirps according to a set of chirp configuration parameters and a chirp profile for the chirp, chirp control signals to cause the radar device to transmit the chirp, the timing control component having a set of chirp configuration parameter inputs, a set of chirp profile parameter inputs, a chirp address output, and a set of chirp control signal outputs;
a chirp configuration storage component having a set of chirp configuration parameter outputs coupled to corresponding inputs of the set of configuration parameter inputs of the timing control component, a chirp profile address output, and a chirp address input coupled to the chirp address output; and
a chirp profile storage component having a set of chirp profile parameter outputs coupled to the set of chirp profile parameter inputs of the timing control component; and
a chirp profile address input coupled to the chirp profile address output.

2. The radar device of claim 1, further comprising a plurality of transmit channels, chirp control inputs of each transmit channel coupled to corresponding chirp control signal outputs of the timing control component.

3. The radar device of claim 1, further comprising a plurality of receive channels, control signal inputs of the receive channels coupled to corresponding chirp control signal outputs of the timing control component.

4. The radar device of claim 1, in which the chirp configuration storage component is operable to store sets of chirp configuration parameter values for a maximum chirp frame size.

5. The radar device of claim 4, in which the maximum chirp frame size is 512 chirps.

6. The radar device of claim 1, in which the chirp profile storage component is operable to store a chirp parameter profile for at least one transmit channel of the radar device.

7. The radar device of claim 1, in which the chirp profile storage component is operable to store a chirp parameter profile for at least one operation mode of the radar device.

8. The radar device of claim 1, in which the timing control component is a state machine.

9. The radar device of claim 1, wherein the chirp configuration storage component is random access memory and the chirp profile storage component is random access memory.

10. A method for generating a frame of chirps in a radar device, the method comprising:
programming a set of chirp configuration parameter values for each chirp in the frame of chirps, in which each set of chirp configuration parameter values includes a chirp profile selection parameter value indicating a chirp profile for the chirp;
programming chirp profile parameter values of at least one chirp profile; and
generating, sequentially for each chirp in the frame, chirp control signals to cause the radar device to transmit the chirp, wherein generation of the control signals is based on the set of chirp configuration parameter values for the chirp and the chirp profile indicated by the chirp profile selection parameter value of the chirp.

11. The method of claim 10, in which a chirp configuration storage component in the radar device stores the sets of chirp configuration parameter values and a chirp profile storage component in the radar device stores the at least one profile.

12. The method of claim 11, in which a number of the sets of chirp configuration parameters is a maximum number of chirps in a frame supported by the radar device.

13. The method of claim 12, in which the maximum number of chirps is 512.

14. The method of claim 10, in which a timing control component in the radar device performs the generating, sequentially for each chirp in the frame, chirp control signals.

15. The method of claim 14, in which the timing control component is a state machine.

16. The method of claim 10, in which a control component in the radar device performs the programming a set of chirp configuration parameter values and the programming chirp profile parameter values.

17. The method of claim 10, in which at least one of the chirp control signals is for at least one of a plurality of transmit channels in the radar device.

18. The method of claim 10, in which at least one of the chirp control signals is for at least one of a plurality of receive channels in the radar device.

19. The method of claim 10, in which the at least one chirp profile includes parameter values for one of a plurality of transmit channels in the radar device.

20. The method of claim 10, in which the chirp profile parameter values of the at least one chirp profile include parameter values for a mode of the radar device.

\* \* \* \* \*